(12) United States Patent
Alavi et al.

(10) Patent No.: US 10,988,643 B2
(45) Date of Patent: Apr. 27, 2021

(54) STARCH AND CARBOXYLIC ACID BINDER COMPOSITIONS AND ARTICLES MADE THEREWITH

(71) Applicant: JOHNS MANVILLE, Denver, CO (US)

(72) Inventors: Kiarash Alavi, Littleton, CO (US); Uranchimeg Lester, Littleton, CO (US); Ameya Natu, Littleton, CO (US); James Cottier, Red Bluff, CA (US); Jawed Asrar, Englewood, CO (US); Philip Francis Miele, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 417 days.

(21) Appl. No.: 16/012,220

(22) Filed: Jun. 19, 2018

(65) Prior Publication Data
US 2019/0382628 A1 Dec. 19, 2019

(51) Int. Cl.
| | |
|---|---|
| *C09J 103/02* | (2006.01) |
| *C09J 4/00* | (2006.01) |
| *E04B 1/78* | (2006.01) |
| *E04B 1/80* | (2006.01) |
| *D04H 1/4218* | (2012.01) |
| *D04H 1/587* | (2012.01) |
| *D04H 1/64* | (2012.01) |
| *D04H 1/4209* | (2012.01) |

(52) U.S. Cl.
CPC .............. *C09J 103/02* (2013.01); *C09J 4/00* (2013.01); *D04H 1/4218* (2013.01); *D04H 1/587* (2013.01); *D04H 1/64* (2013.01); *E04B 1/78* (2013.01); *E04B 1/80* (2013.01); *D04H 1/4209* (2013.01)

(58) Field of Classification Search
CPC .... E04B 1/78; E04B 1/80; D04H 1/64; D04H 1/4218; D04H 1/587; C09J 103/02; C09J 4/00
See application file for complete search history.

(56) References Cited

U.S. PATENT DOCUMENTS

| | | | |
|---|---|---|---|
| 4,134,242 | A | 1/1979 | Musz et al. |
| 8,864,893 | B2 | 10/2014 | Hawkins et al. |
| 2005/0215153 | A1 | 9/2005 | Cossement et al. |
| 2006/0252855 | A1 | 11/2006 | Pisanova et al. |
| 2008/0108741 | A1 | 5/2008 | Van Herwijnen et al. |
| 2009/0007644 | A1 | 1/2009 | Freeman et al. |
| 2009/0170978 | A1 | 7/2009 | Kelly |
| 2009/0275699 | A1* | 11/2009 | Zhang .................... C09J 135/00 525/54.26 |
| 2010/0129593 | A1 | 5/2010 | Rempt et al. |
| 2010/0282996 | A1 | 11/2010 | Jaffrennou et al. |
| 2011/0021101 | A1 | 1/2011 | Hawkins et al. |
| 2012/0070645 | A1 | 3/2012 | Jaffrennou et al. |
| 2012/0133073 | A1 | 5/2012 | Pacorel et al. |
| 2012/0168054 | A1 | 7/2012 | Chen et al. |
| 2012/0319029 | A1 | 12/2012 | Jaffrennou et al. |
| 2013/0032749 | A1 | 2/2013 | Jaffrennou et al. |
| 2013/0295361 | A1 | 11/2013 | Varagnat et al. |
| 2013/0334726 | A1 | 12/2013 | Hernandez-Torres et al. |
| 2014/0083328 | A1 | 3/2014 | Lochel, Jr. et al. |
| 2015/0152244 | A1 | 6/2015 | Hernandez-Torres |
| 2016/0053418 | A1 | 2/2016 | Eckert et al. |
| 2016/0159687 | A1 | 6/2016 | Zheng et al. |
| 2016/0214890 | A1 | 7/2016 | Savonnet et al. |
| 2017/0036955 | A1 | 2/2017 | Obert et al. |
| 2017/0137614 | A1* | 5/2017 | Casado Dominguez .................... C08L 33/02 |

FOREIGN PATENT DOCUMENTS

| | | |
|---|---|---|
| EP | 2 199 333 B1 | 10/2012 |
| EP | 3 034 555 A1 | 6/2016 |
| WO | 2008053332 A1 | 5/2008 |
| WO | 2009079254 A1 | 6/2009 |

* cited by examiner

*Primary Examiner* — C Melissa Koslow
(74) *Attorney, Agent, or Firm* — Robert D. Touslee

(57) ABSTRACT

Fiber-containing composites are described that include woven or non-woven fibers, and a binder that holds the fibers together. The binder may include the reaction product of a starch and a polycarboxylic acid. The starch has a weight average molecular weight that ranges from $1 \times 10^6$ Daltons to $1 \times 10^7$ Daltons. The fiber-containing composite has an unaged tensile strength of greater than 4.0 and an aged tensile strength greater than 3.0. Also described are methods of making the fiber-containing composites. The methods may include applying a binder composition to fibers to form coated fibers, measuring a moisture content of the coated fibers, and curing the coated fibers in a curing oven to form the fiber-containing composite. The binder composition may include a starch having a weight average molecular weight that ranges from $1 \times 10^6$ Daltons to $1 \times 10^7$ Daltons, and a polycarboxylic acid.

51 Claims, 6 Drawing Sheets

STARCH AND CARBOXYLIC ACID BINDER COMPOSITIONS AND ARTICLES MADE THEREWITH

BACKGROUND OF THE INVENTION

Carbohydrates have been used in binder compositions as a safe and sustainable alternative to petroleum-based binders. Unlike the phenol-formaldehyde and urea-formaldehyde binder compositions used for decades in fiberglass insulation and mats, carbohydrates do not off-gas formaldehyde. Unlike binder compositions made primarily from acrylics, vinyl alcohols, and olefins, carbohydrates are sourced primarily from renewable plant matter that does not deplete oil resources and contribute to a net increase in greenhouse gas emissions. Thus there is continued interest in using more carbohydrates in binder compositions for products like fiberglass insulation.

Carbohydrates can be incorporated into binder compositions as a reactant, a filler, or both. When carbohydrates are incorporated into binder compositions as reactants, they form covalent bonds with other reactants to form a reaction product. Typically, the reaction product is a crosslinked, thermoset polymer. In many instances, the reaction product makes up the highest percentage weight of the binder. Carbohydrate filler (also called extender) generally does not react with other binder components to form a polymerized reaction product. Carbohydrate filler is often less expensive than petroleum-based binder components and can be added to reduce the cost of the binder composition. The tendency of crosslinked carbohydrates to char when exposed to heat and flame can also provide increased resistance to flame penetration in binder-fiber products used as insulation and construction materials.

One example of a class of carbohydrates that act as a reactant are polysaccharides such as dextrins and maltodextrins that react with polycarboxylic acids to form crosslinked binder products. The reaction between these polysaccharides and polycarboxylic acids are generally slower than the reactions that form conventional formaldehyde-based and acrylic thermoset polymers. As a result, manufacturing facilities can become significantly less productive when converting from formaldehyde-based binders to these dextrin and maltodextrin-based binders. Thus, there is a need to develop polysaccharide-based binder systems with a reduced curing time relative to dextrin and maltodextrin-based binder compositions.

Another example of a class of carbohydrates that participate as a reactant in a binder composition is reducing sugars that react with nitrogen-containing nucleophiles in Maillard reactions. Maillard reactions can start when a reducing sugar carbohydrate that has (or can isomerize to form) an aldehyde or ketone moiety reacts with a nitrogen nucleophile, such as an amine or ammonium ion. The initial nucleophilic attack by the nitrogen nucleophile on the reducing sugar's carbonyl carbon sets of a cascade of reactions that can produce a polymerized Maillard reaction product. These crosslinked Maillard reaction products can have desirable properties for cured binders, including high tensile strength and good moisture resistance. However, they often also produce a non-uniform brown color that can be aesthetically off-putting in many applications. They can also become overly brittle when cured and form a large number of particulates when insulation containing the cured binder is folded or compressed. Thus, there is demand in the industry for alternative carbohydrate reactants and reaction systems that avoid the problems associated with Maillard reaction products. These and other issues are addressed in the present application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

BRIEF SUMMARY OF THE INVENTION

Figure 1:
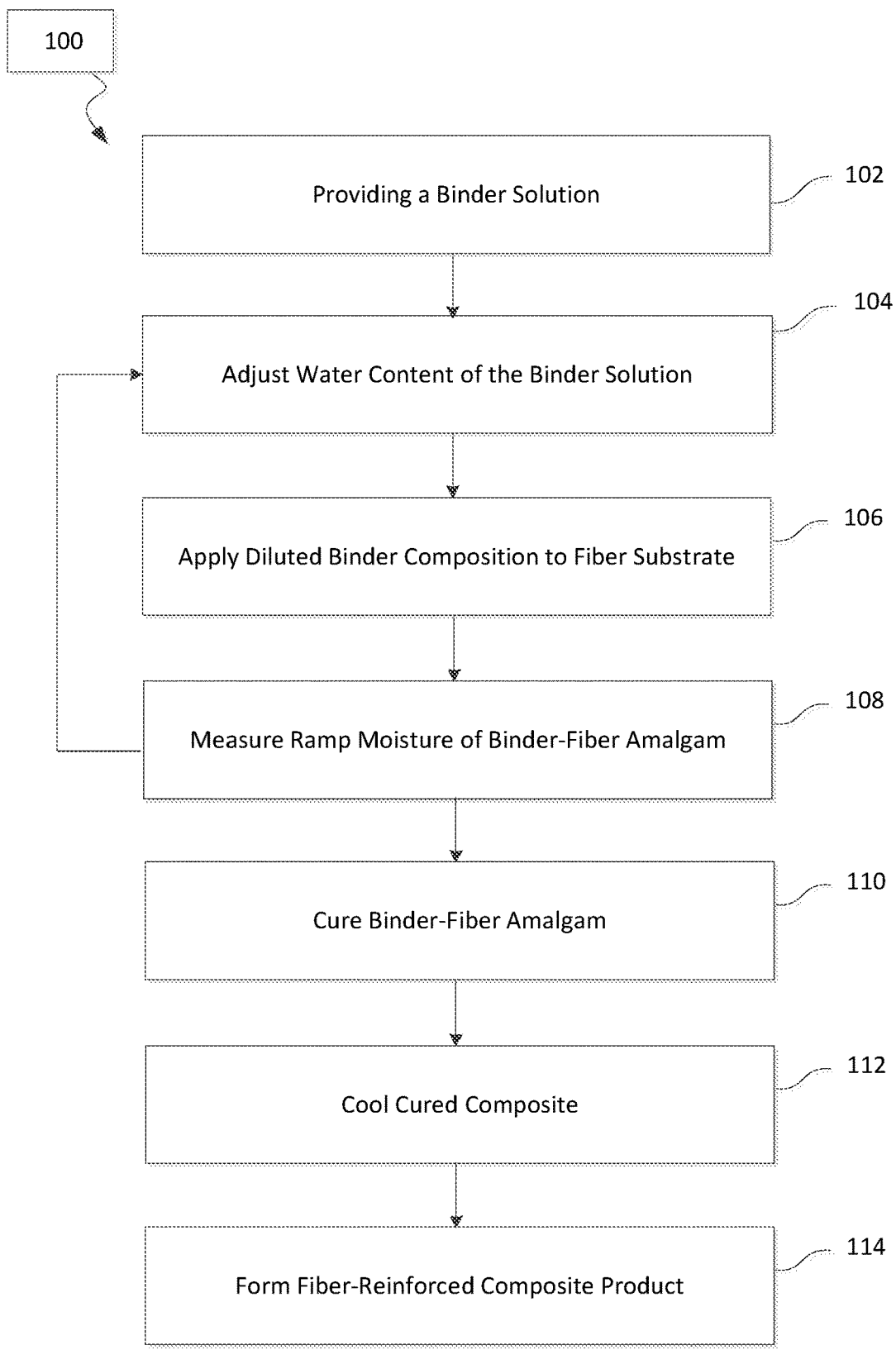
FIG. 1 is a flowchart showing selected aspects of a method of making a fiber-containing composite according to embodiments of the invention.

Fiber-containing composites are described that include binders made from reaction products of starches and polycarboxylic acids. The starches used in the binder compositions have a size range of about 1 million to 10 million Daltons, which has been found to provide superior mechanical properties to the final composite compared with smaller-sized carbohydrates like dextrin and maltodextrin as well as larger-sized starches (e.g., greater than 10 million Daltons). During curing, the starches react with polycarboxylic acids in a condensation reaction (e.g., a polyesterification reaction) to form the polymerized binder. A cure catalyst may also be included in the binder composition to accelerate the reaction rate between starch and polycarboxylic acid and reduce the time it takes for the binder composition to fully cure.

The binder compositions are aqueous solutions in which the starch and polycarboxylic acid are dissolved. Due to the relatively high concentration of the acid, the pH of these aqueous solutions can be quite acidic (e.g., a pH of approximately 2). Depending on the use of the fiber-containing composite, a corrosion inhibitor may be added to the binder composition to keep the acidity of the binder from corroding substrates that come in contact with the composite, especially metal substrates. It has been discovered that certain transition metal complexes can act as effective reducing agents to prevent the oxidation of metal surfaces exposed to the acidic binder. The starches and polycarboxylic acids used in the present binder compositions do not react with the transition metals to form precipitates, as is often seen with acrylic binder systems.

The size of the starches used in the present binder compositions has created some challenges in applying and curing the compositions on fiber substrates. The starches are large enough to be slowed in their migration through the binder solution to available polycarboxylic acid reactants. As the polymerization reactions progress during curing, some of the large starch molecules can become stranded and remain unreacted in the binder of the final composite. A significant amount of unreacted starch can harm the properties of the composite, including decreasing the composites rigidity and reducing its resistance to moisture. One approach to increasing the mobility of the starch molecules is to raise the cure temperature. This approach quickly reaches an upper limit when the cure temperature risks causing thermal breakdown of the starch and other molecules in the binder. Another approach is to dilute the binder composition with more water to create additional separation between reactant molecules. This approach also reaches a limit where the reactants are too separated to come together in a practical amount of time as the amalgam of diluted binder composition and fibers pass through a curing oven.

It has been discovered that the challenge of polymerizing the present binder compositions can be addressed by control of the ramp moisture in the compositions as they travel to a curing oven. Ramp moistures of the binder composition that range from approximately 3 to 5 wt. % (e.g., about 4 wt. %) are shown to produce cured binders with outstanding mechanical properties. Outside of this range, lower ramp moistures result in the binder composition being too viscous and too concentrated, which can reduce the composition's ability to migrate through the fiber substrate in a practical amount of time. The poor flow created by the high viscosity as a result of the low ramp moisture can leave the fibers incompletely covered, and some fibers in the bulk of the fiber substrate not covered at all. The interstitial spaces between fibers may also be incompletely filled (or not filled at all) by the slow flowing, viscous binder composition. In addition, the low ramp moisture can over concentrate the binder composition and hinder the uniform mixing and reaction between the starch and polycarboxylic acid molecules. This can result in less than complete polymerization of the cured binder in the fiber-binder composite product.

Higher ramp moistures, on the other hand, can result in the binder composition being too dilute. More time and/or higher temperatures are needed to remove the excess water when the fiber-binder amalgam is being cured. Additional time slows the production speed and higher temperatures can create a host of unwanted reactions and thermal decomposition of the binder. Thus there is a tension between setting the ramp moisture too low and setting it too high. The mechanical properties of the fiber-containing composite is also surprisingly sensitive to the deviation in ramp moisture from an optimum level. The present application describes methods of making fiber-containing composites that measure and control the level of ramp moisture in the binder composition such that the composites have excellent mechanical properties.

Embodiments include fiber-containing composites that comprise woven or non-woven fibers, and a binder that holds the fibers together. The binder comprises a reaction product of a starch, having a weight average molecular weight that ranges from $1 \times 10^6$ Daltons to $1 \times 10^7$ Daltons, and a polycarboxylic acid. The fiber-containing composite has an unaged tensile strength of greater than 4.0 Megapascals (MPa) and an aged tensile strength greater than 3.0 (MPa).

Embodiments further include fiber-containing composites with enhanced corrosion resistance. The fiber-containing composites comprise woven or non-woven fibers, and a binder that holds the fibers together. The binder is formed by curing a binder composition comprising:
  20 wt. % to 80 wt. % starch having a weight average molecular weight that ranges from $1 \times 10^6$ Daltons to $1 \times 10^7$ Daltons,
  20 wt. % to 80 wt. % polycarboxylic acid,
  1 wt. % to 10 wt. % cure catalyst, and
  water.

The water content of the binder composition may be determined by measuring a moisture content of the fibers coated with the binder composition, comparing the moisture content of the coated fibers to a preset moisture value for the fibers coated with the binder composition, and adjusting the water content of the binder composition when the moisture content of the coated fibers differs by more than an accepted deviation from the preset moisture value. In embodiments, the accepted deviation of the moisture content from the preset moisture value may range from 0.5 wt. % to 2 wt. %.

Embodiment still further include methods of making the fiber-containing composites. The methods may include applying a binder composition to fibers to form coated fibers. The binder composition comprises a starch having a weight average molecular weight that ranges from $1 \times 10^6$ Daltons to $1 \times 10^7$ Daltons, and a polycarboxylic acid. The methods may further include measuring a moisture content of the coated fibers, wherein if the moisture content of the coated fibers differs by more than an accepted deviation from a preset moisture value, then the moisture content is adjusted to be closer to the preset moisture value. In embodiments, the preset moisture value may range from 4 wt. % to 6 wt. % of the binder composition coated on the fibers. In additional embodiments, the preset moisture value may range from 4 wt. % to 5 wt. % of the binder composition coated on the fibers. In addition, the method may include curing the coated fibers in a curing oven to form the fiber-containing composite.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Exemplary binder compositions are described that include an aqueous solution of starch and polycarboxylic acid. The binder compositions may also include a cure catalyst, corrosion inhibitor, and coupling agent, among other additional compositions. When cured, the starch and polycarboxylic acid react to form a polymerized binder with excellent mechanical properties, no outgassing of formaldehyde, and substantially reduced levels of petroleum-sourced reactants. The binder compositions are used to make fiber-containing composites such as fiberglass insulation for buildings and appliances, among many other types of final products. Before discussing the composite articles, as well as the systems and methods of making them, additional details about the binder compositions are provided.

Exemplary Binder Compositions

The present application draws a distinction between the binder composition and a binder solution. A binder composition is the final composition that is applied to the fiber substrate, and therefore includes all the binder components at concentration levels that provide a fiber-binder amalgam with a ramp moisture in or near a target range. A binder solution is the concentrate of at least starch and polycarboxylic acid used to make the binder composition. In some instances, the binder solution is made offsite, stored and transported to the manufacturing facility where it is diluted with additional water and mixed with remaining binder component to form the binder composition.

Exemplary binder solutions may include 30 wt. % to 50 wt. % water. In some examples, the binder solution is concentrated further to have less than 30 wt. % water, while in other examples the binder solution is more dilute and has more than 50 wt. % water. Exemplary binder solutions may have 10 wt. % to 60 wt. % starch, and 5 wt. % to 50 wt. % polycarboxylic acid. For examples of binder solutions that also include a cure catalyst (i.e., a polymerization catalyst), the catalyst 0.1 wt. % to 5 wt. % may be present in the binder solution. Additional binder components may also be present in the binder solution depending on the degree to which they stabilize or destabilize the binder solution.

As noted above, the binder solution may be diluted with additional water to form the binder composition that is applied to the fibers. Exemplary binder compositions may include 85 wt. % to 97 wt. % water (i.e., a total solids level of about 3 wt. % to about 15 wt. %). Exemplary binder compositions may also include 0.1 wt. % to 3 wt % of a coupling agent (e.g., a silane coupling agent), and/or 0.1 wt. % to 5 wt. % of a dedusting oil. Exemplary binder compositions may also include one or more of an anticorrosion agent, a water repellant, a biocide, and a processing aid additive, among other binder components. Some or all of these additional binder component may be mixed with the binder solution in the binder table just prior to applying the binder composition to the fibers. Alternatively, one or more of these additional binder components may be applied to the fibers, or fiber-binder amalgam, independently from the binder composition. Additional details about some of the binder components are discussed below.

The molar ratio of the polycarboxylic acid to starch in the binder composition can have significant effects during curing. When the molar ratio is 1:1 or more, favoring higher amounts of the polycarboxylic acid relative to the starch, more unreacted polycarboxylic acid can become trapped within the crosslinked polymers. The unreacted polycarboxylic acid may eventually decompose at the curing temperatures to create undesirable volatile organic compound (VOC) emissions. They may also undergo exothermic reactions with other organic molecules in the binder composition besides the starches, for example a carbon-rich dedusting oil. When these exothermic reactions become concentrated in areas where excess unreacted polycarboxylic acids are trapped, they can create hot spots that can thermally decompose the surrounding crosslinked polymers.

One the other hand, a molar ratio of polycarboxylic acid to starch that is too low (i.e., too concentrated in starch relative to polycarboxylic acid) can result in a cured binder where the starch is insufficiently crosslinked. This can produce final cured binder composites with low tensile strength, under both unaged and aged/humid conditions, that can adversely affect the product's structural integrity.

It has been discovered that reducing the polycarboxylic acid to starch ratio to 1:2 or less (e.g., a molar ratio ranging from 1:2 to 1:3) significantly reduces the VOC emissions and exothermic hot spots in the curing binder that are caused by unreacted polycarboxylic acids being trapped in the crosslinked polymers of the binder. While there are still some specific formulations and cure conditions where molar ratio parity (i.e., a 1:1 molar ratio of polycarboxylic acids to starch) is appropriate, there are more formulations and cure conditions where a molar ratio that favors the starch is appropriate. On the other hand, polycarboxylic acid to starch molar ratios of less than 1:3 can adversely affect the tensile strength of the cured binder because of reduced crosslinking of the starches. Exemplary molar ratios of polycarboxylic acid to starch range from 1:2 to 1:3.

Exemplary Starches

The present binder compositions include starch as a polymerization reactant. Exemplary starches include unmodified and modified starches having a weight average molecular weight of $1 \times 10^6$ to $10 \times 10^6$ Daltons (i.e., 1 million to 10 million g/mol). Exemplary sizes of the starch may further include $3 \times 10^6$ Daltons to $5 \times 10^6$ Daltons, and about $4 \times 10^6$ Daltons. Binder compositions made with starches sized smaller than $1 \times 10^6$ Daltons, which include most dextrins and maltodextrins, produce fiber-containing composites that perform poorly on measures of tensile strength for both unaged, and particularly for aged composites. Similarly poor measurements of tensile strength are observed in binders that use starches with molecular weights greater than 10 million Daltons.

Speculation about why the 1-10 million Dalton (and even more particularly the 3-5 million Dalton) molecular weight range for the starches produces composites with such high tensile strength has focused on the lack of added crosslinking agents in many formulations of the binder composition. Conventional starch-containing binders that use smaller-sized starches (i.e., less than 1 million Dalton) usually also include a hydroxyl- or amino-type crosslinking agent such as a $C_1$-$C_6$ polyol, an alkanol amine, etc. These crosslinking agents are believed to increase the degree of crosslinking between the starches and polycarboxylic acids to an extent that raises the tensile strength to levels seen in the present binder compositions. However, the high reactivity of these crosslinking agents can also reduce the stability of the binder composition and also increase costs. Thus, binder compositions that can produce fiber-containing composites with comparable physical properties like tensile strength and droop without requiring added crosslinking agents can be advantageous in many production situations.

The starches may include natural starches sourced from a plant. Exemplary plant sources include corn, potatoes, peas, rice, tapioca, wheat, oat, barley, and rye, among other types of plants. The starches may include ionically modified starches that have a positive charge (i.e., cationically modified) or a negative charge (i.e., anionically modified). Examples of cationically-modified starches include quaternary ammonium-type cationic starches and tertiary amino-type cationic starches. Examples of anionically-modified starches include phosphate-type anionic starches. Ionically-modified starches may also include amphoteric starches that have both positive and negative groups on the starch. The relative amounts of starch used in the binder composition may be set by a target molar ratio of the carbohydrate units that make up the starch to the polycarboxylic acid. In this sense, the starch may be thought of as a carbohydrate polymer made up of hundreds or thousands of repeating carbohydrate units (i.e., carbohydrate monomers). In some embodiments, the starch is made from a single carbohydrate unit, while in additional embodiments the starch is made from two or more types of carbohydrate units (i.e., a starch co-polymer).

Exemplary Polycarboxylic Acids

The present binder compositions also include polycarboxylic acid as polymerization reactant. The polycarboxylic acid includes at least two carboxylic acid groups that are available for reaction with the starch reactant. In some instances the polycarboxylic acid groups may bond together to form an anhydride that can be hydrolytically converted back into the acid form. Thus, examples of the polycarboxylic acids also include organic acid anhydrides that can hydrolyze into polycarboxylic acid in the binder solution. Exemplary polycarboxylic acids may include at least one polycarboxylic acid selected from the group consisting of citric acid, oxalic acid, maleic acid, succinic acid, adipic acid, itaconic acid, malic acid, butane tetracarboxylic acid, phthalic acid, isophtalic acid, terephtalic acid, trimellitic acid, pyromellitic acid, and benzophenone tetracarboxylic acid, among other polycarboxylic acids.

The polycarboxylic acids are normally monomeric polycarboxylic acids. In some instances they may be oligomerized to form oligomeric polycarboxylic acids (e.g., oligomers made up of 2 to 10 monomer units). In some embodiments of the binder compositions polymeric polycarboxylic acids are excluded due to the large size of the starches. As noted above, the large size of the starches can slow their migration in the binder composition, especially during curing. The starches can be slowed even more when the polycarboxylic acid is also a large, bulky molecule. Thus polymeric polycarboxylic acids, such as polymeric polycarboxylic acids with molecular weights of greater than 4000 Daltons (e.g., greater than 2000 Daltons), may be excluded from the binder composition. These exemplary polymeric polycarboxylic acids may include polyacrylic acids. They may also include copolymers of carboxylic acids and vinyl compounds, such as styrene maleic acid, and styrene maleamic acid, among other copolymeric polycarboxylic acid compounds. They may further include an anhydride form of the copolymeric acids, such as styrene maleic anhydride.

Exemplary Coupling Agents

The binder compositions may include a coupling agent that strengthens the bonding between the binder and the fibers. Exemplary coupling agents include silane coupling agents that include a silicon-containing moiety and an organic moiety. The silicon-containing moiety may be an organo-silane group, and more specifically a hydrolysable silyl group represented by $Si-(OR)_n$, where n represents 1, 2 or 3, and "OR" represents an alkoxy group such as a methoxy and/or exthoxy group. The organic moiety may be reactive or unreactive in forming covalent chemical bonds with the polymers of the binder. Examples of reactive organic moieties include vinyl groups, epoxy groups, amino groups, methacryloxy groups, mercapto groups, etc. Examples of unreactive organic moieties include alkyl groups and aryl groups, among others. More specific examples of coupling agents include amino-propyl triethoxy silane, glycidoxy propyl triethoxy silane, isocyanate triethoxy silane, mercapto propyl triethoxy silane, vinyl triethoxy silane, acryloxy propyl triethoxy silane, propyl triethoxy silane, and 3-(glycidoxypropyl) methyldiethoxysilane among other silane compounds. When a coupling agent is added, it's typically added at a level of 0.1 wt. % to 2 wt. % of the dry weight of the binder composition.

Exemplary Cure Catalysts

The binder compositions may include a cure catalyst (i.e., polymerization catalyst) to speed the rate of reaction and/or lower the reaction temperature of the polymerization reaction between the starch and polycarboxylic acid reactants. Exemplary cure catalysts include alkali metal phosphate salts such as sodium hypophosphite (SHP). Exemplary cure catalysts may also include phosphorous- and/or sulfur-containing salts of metals such as titanium, zirconium, zinc, and tin, among other metals. When a cure catalyst is added, it's typically added at a level of 1 wt. % to 10 wt. % of the dry weight of the binder composition. Additional concentration ranges include 1 wt. % to 5 wt. %; 2 wt. % to 5 wt. %; 3 wt. % to 5 wt. % and 4 wt. % to 5 wt. %.

Exemplary Anticorrosion Agents

The corrosion of metals, in particular iron and steel, after prolonged contact with fiberglass insulation has gotten worse with the replacement of less acidic phenol-formaldehyde and urea-formaldehyde binders to more acidic formaldehyde-free binders. In several types of formaldehyde-free binders, such as polyacrylic acid-based binders, the acidic corrosion is made worse by the formation of chelating compounds that further dissolve and sequester the metal ions.

Conventional methods of addressing the increased corrosion potential of formaldehyde-free binders has been to raise the pH by adding caustic (i.e., basic) compounds to the binder composition. For example, a solution of a strong base like sodium hydroxide is added to an acrylic acid binder composition to raise the pH as high as 8 or 9 to reduce the acidic corrosion caused by the binder-fiber product (e.g., fiberglass insulation batt). However, the pH of the binder solution is below 3, because the polymerization of the acrylic acid is acid catalyzed. During polymerization, the pH of the polymerizing binder composition is kept low by introducing a strong acid like sulfuric acid. The combination of sulfuric acid and sodium hydroxide generates a lot of sodium sulfate in the binder composition. The sodium sulfate is seen as an undesirable but necessary contaminant in the binder composition that make the binder more hydrophilic, thereby reducing its moisture resistance, as well as reducing the mechanical properties of the binder (e.g. tensile strength). It also requires a lot of handling of strong acids and bases and generates significant amounts of waste during insulation production that can be an irritant to manufacturing workers and expensive to dispose.

The present binder compositions may include anticorrosion agents that use a different approach to countering the effects of acid corrosion besides simply adding a strong base to raise the pH of the binder. These anticorrosion agents can form a protective coating on metal surfaces that can significantly slow the rate of acidic corrosion. In some instances, the anticorrosion agents have an available lone pair of electrons that facilitate electron transfer from the anticorrosion agent to the metal surface forming a coordinate covalent bond. This is one mechanism by which the anticorrosion agent forms the protective film on the metal surface. In additional instances, the anticorrosion agents reduce metal oxides and metal salts back to neutral metals on the surface. In many instances, these anticorrosion agents cannot be used in conventional polymerized polycarboxylic acid binders (e.g., polyacrylic acid binders) because they form complexes with the acids that result in their precipitation.

Exemplary anticorrosion agents may include sodium nitrite, zinc sulfate, zinc nitrite, stannous sulfate, stannous chloride, dicyandiamide (DICY), sodium metaborate and ammonium pentaborate, among others. Additional examples of anticorrosion agents include calcium borosilicate, strontium and zinc phosphosilicates, and triethanol amine/diethanol amine phosphate. When an anticorrosion agent is added to the binder composition, it's typically added at a level of 1 wt. % to 10 wt. % of the dry weight of the binder composition. Additional concentration ranges include 1 wt. % to 5 wt. %; and 1 wt. % to 2.5 wt. %.

Exemplary Added Crosslinking Agents

The present binder compositions may include one or more added crosslinking agents. Exemplary added crosslinking agents may include compounds having two or more moieties capable of bonding with the reactants and/or the polymerized reaction products in the binder composition. These crosslinking moieties may include hydroxyl groups and carbonyl groups, among other moieties. Crosslinking agents may include compounds with a single type of crosslinking moiety (i.e. two or more carbonyl groups) as well as compounds with at least two different types of crosslinking moieties (i.e., a carbonyl group and a hydroxyl group).

The crosslinking agents may be added in mole ratios that range from 0.1:1 to 1:1 relative to the number of moles of the polycarboxylic acid and/or starch reactants. Additional mole ratios of the crosslinking agent to the polycarboxylic acid may include 0.25:1 to 0.5:1. They may also include 0.5:1:1 as the mole ratio of the crosslinking agent to the polycarboxylic acid to the starch.

Crosslinking agents may include polyaldehyde and polyketone compounds. For example, crosslinking agents may include dialdehyde compounds like glyoxal, that includes two aldehyde groups covalently bonded at the carbonyl carbons. Each of these carbonyl carbons is capable of independently reacting with reactive moieties on the polymerized reaction products to crosslink them. The additional crosslinking can enhance the properties of the cured binder in a variety of ways, including an increase in crosslinking density, an increase in tensile strength, an increase in rigidity of an fiber-containing batt, an increase in the recovery of a fiber-containing insulation batt, among other properties.

Crosslinking agents may also include polymeric emulsions and low molecular weight polyols. Exemplary polyols include glycerol, sorbitol, and triethanolamine, among others. In some instances, the crosslinking agent may also have functionality as a plasticizer in the binder, and/or a viscosity modifier in the binder composition that enables its easier handling and application.

Exemplary Dedusting Oils & Agents

The binder composition may also include one or more dedusting oils that help reduce abrasion and fiber breakage by lubricating the surfaces of the fiber so that less fiber dust is generated. The dedusting oils are also tacky fluids that help hold broken fibers, and other particulates in the composite, to prevent them from escaping into the surrounding environment, such as going airborne. Dedusting oils may include mineral oils and vegetable oils, among other types of oil. In exemplary embodiments, the dedusting oil is included in the pre-cured binder composition. In additional embodiments, the dedusting oil may be applied to the binder composite after curing. In still further embodiments, the dedusting oil may be both included in the pre-cured binder composition and applied to the binder composite after curing. Dedusting oil may be included in the binder composition at levels of 0.1 wt. % to 1 wt. % of the final binder composite. Additional concentration ranges include 0.1 wt. % to 0.8 wt. %; and 0.1 wt. % to 0.5 wt. %, among other ranges.

Dedusting Agents may be incorporated into the binder composite. Exemplary dedusting agents include polyols, such as glycol and glycerol. They may also include polyether compounds such as polyethylene glycol ("PEG"), polypropylene glycol ("PPG"), and glycerol polyethers, among other polyether compounds. The polyether compounds may have a size range of 2000 g/mol or less, 1000 g/mol or less, 2000 g/mol to 500 g/mol, and 2000 g/mol to 1000 g/mol, among other ranges. In some instances the dedusting agent may be applied to the binder composite without a solvent (i.e., neat), while in additional instances the dedusting agent is mixed with a solvent to meet a target viscosity (e.g., 600 to 200 cSt at 75° F.). Exemplary solvents include water. They also include organic soluble electrolytes such as calcium acetate, lithium acetate, amine acetates (e.g., triethanolamine acetate), and sodium benzoate, among others. Exemplary solvents further include combinations of water and organic soluble electrolytes.

As discussed further below, the dedusting agents having hydroxyl groups may not be included in the pre-cured binder composition because of their reactivity with other binder components, such as polycarboxylic acids. Instead, the dedusting agent may added to the cured binder composite during a cooling stage immediately following the exit of the composite from a curing oven. The dedusting agent may be included in the final binder composite at levels of 0.1 wt. % to 1 wt. % of the final binder composite. Additional concentration ranges include 0.1 wt. % to 0.5 wt. %; and 0.1 wt. % to 0.3 wt. %.

Exemplary Additives

The binder composition may also include one or more additives that do not participate as polymer reactants in the binder. These exemplary additives may include biocides, adhesion promoters, oxygen scavengers, solvents, emulsifiers, pigments, organic and/or inorganic fillers, flame retardants, anti-migration aids, coalescent aids, wetting agents, plasticizers, anti-foaming agents, colorants, waxes, suspending agents, anti-oxidants, among other components. When an additive is added to the binder composition, it's typically added at a level of 0.5 wt. % to 10 wt. % of the dry weight of the binder composition. Additional concentration ranges include 0.5 wt. % to 5 wt. %; and 0.5 wt. % to 2.5 wt. %.

In some instances, the additives are pre-mixed with the binder composition before it is applied to fibers and cured. In additional instances, the additives may be introduced to the curable, curing, and/or cured fiber-containing composite during or after the initial binder composition is applied to the fibers.

Exemplary Methods of Making the Binder Composition

Making the binder composition starts with mixing at least the starch with water, followed by heating and string the mixture until the starch dissolves to form an aqueous solution. The temperature and time needed to dissolve the starch can vary depending on the type and concentration of the starch (and other components if present) added to the water. When the starch and polycarboxylic acid are both added before the starch dissolves, the lower pH from the acid permits the solids to dissolve at lower temperatures and shorter times. Typically to make a binder solution with 50 wt. % dissolved solids, the temperature of a starch and polycarboxylic acid mixture is raised to about 80° C. for 45 minutes. When the polycarboxylic acid is held back until the starch dissolves, the starch only mixture is typically raised to about 90° C. for 1 hour.

After the starch, and other compounds if present, are dissolved to form the hot binder solution, it may be thermally quenched to prevent the starch from getting overly viscous and/or polymerized. Thermal quenching may involve lowering the temperature of the hot binder solution to 50% or less of its peak temperature in 1 hour or less. For example, if the hot binder solution has a peak temperature of 80° C., thermal quenching will lower the temperature to 40° C. in 1 hour or less. In many instances, the same heating element used to raise the temperature of the mixture may be adjusted to effect the thermal quench. For example, a heating coil positioned inside the container holding the starch mixture may function as a quenching coil by lowering the temperature of the fluid that passes through the coil.

The decision to add additional binder components before or after the starch is dissolved can have significant effects on both the viscosity of the binder composition as well as the mechanical properties of the binder that is formed from the binder composition. In a first embodiment, the starch may be dissolved in the water before any additional binder compounds are added such as the polycarboxylic acid and/or the cure catalyst. The binder composition formed typically has a higher viscosity range (e.g., 600-1000 cps at 23° C.) than other sequences where one or more additional ingredients are added with the start to the water before they are dissolved. For example, another embodiment has both the starch and a polycarboxylic acid (e.g., citric acid) mixed together in the water and dissolved. The binder composition formed typically has a lower viscosity range (e.g., 100-600 cps at 23° C.) than measured for binder compositions when the starch is dissolved in the absence of the polycarboxylic acid. In still another embodiment, starch, polycarboxylic acid, and a cure catalyst are all mixed together in the water and dissolved. These binder compositions also typically have lower viscosity ranges than when starch alone is dissolved, but often have a higher viscosity (e.g., 300-600 cps at 23° C.) than aqueous solutions consisting of just the dissolved starch and polycarboxylic acid. Binders formed from binder compositions where starch, polycarboxylic acid, and a cure catalyst are all dissolved together also show increased tensile strength (e.g., about a 10% increase in unaged tensile strength) compared to binder that add a cure catalyst after the starch and polycarboxylic acid are dissolved in water.

The aqueous binder solution of starch, polycarboxylic acid, and other binder components (if present) may be supplied as a concentrate to a manufacturing facility for the fiber-containing composite products. The binder solutions are sufficiently stable to be stored and shipped at ambient conditions (e.g., temperatures ranging from 10° C. to 30° C.) at solids concentrations of 20-60 wt. %, 20-50 wt. %, 30-50 wt. %, 40-50 wt. %, etc. When the concentrated binder solutions are ready for use, they may be diluted with additional water and other binder components shortly before being applied to the fiber substrate. The methods and systems for using the binder compositions to make fiber-containing composite products are discussed below.

Exemplary Fibers

The binder compositions described above are applied to fibers. The fibers can be made from a variety of types of fibers, including glass fibers, carbon fibers, mineral fibers, stone wool fibers, and organic polymer fibers, among other kinds of fibers. In some embodiments the fibers are made from a single type of material (e.g., glass fibers). In additional embodiments, the fibers may make up two or more types of materials (e.g., a combination of glass fibers and organic polymer fibers). The fibers may make up about 50 wt. % to about 99.5 wt. % of the fiber-containing composite product. Additional exemplary fiber weight ranges include about 90 wt. % to about 99 wt. %; 85 wt. % to 99 wt. %; and about 75 wt. % to about 95 wt %.

As discussed below, the binder composition may be applied to the fibers as they are forming a fiber substrate, or the binder composition may be applied to an already-formed substrate. When the binder composition is applied to the fibers as they are forming the fiber substrate, it may be applied to individual fibers as they are being collected into the fiber substrate. In these instances, the fiber substrate is formed at the same time as the binder-fiber amalgam. Alternatively, the fibers may already be collected, arranged and/or oriented into a fiber substrate and the binder composition subsequently applied. In these instances the fiber substrate may be a woven or non-woven fiber mat, or a plurality of mats that have been stitched or otherwise joined together.

Exemplary Methods of Making Fiber-Containing Composite Products

FIG. 1 shows a flowchart containing selected steps in an exemplary method 100 of making fiber-containing composite products. The method 100 includes providing a binder solution 102. The binder solution may be supplied to equipment that is used to make the fiber-containing composite product. The binder solution may be a concentrated aqueous solution of the starch and polycarboxylic acid (e.g., 50 wt. % solids dissolved in the binder solution). In some embodiments, the binder solution also includes one or more binder components selected from a cure catalyst, an anticorrosion agent, a coupling agent, and an additive (or additives). In additional embodiments, some or all of these binder components may be separately added to the binder solution just before or during the application of the final binder composition to a fiber substrate. In some instances, none of the binder component was previously added to the binder solution when it is separately added just before or during the application of the binder composition. In other instances, some of the binder component was previously added to the binder solution (e.g., at the time the binder solution was formed) when an additional amount of the binder component is separately added just before or during the application of the binder composition.

After the binder solution is provided to the equipment used to make the fiber-containing composite product, the water content of the binder solution may be adjusted 104. Water and/or an aqueous solution from an external source may be added to the binder solution to dilute the concentration of binder solids (e.g., starch and polycarboxylic acid) in the binder solution. The amount of added water may reduce the binder solids in the final binder composition to 5 wt. % to 15 wt. % solids based on the total weight of the binder composition. Exemplary binder solids concentration ranges also include 8 wt. % to 12 wt. % solids; 9 wt. % to 11 wt. % solids; and about 10 wt. % solids, among others. The water added to the binder solution may have a range of purity and include one or more of distilled water, deionized water, softened water, filtered water, and municipal or process water. The aqueous solution may include diluted or undiluted binder composition that has been captured from the binder-fiber amalgam and introduced to fresh binder solution.

In addition to adjusting the water content of the binder solution, additional binder components may be added to the final binder composition at step 104. These components may include one or more of a cure catalyst, an anticorrosion agent, a coupling agent, and an additive (or additives). For example, silane coupling agents that react quickly with the binder reactants may be introduced with the water to the binder solution to make the final binder composition.

The binder composition may then be applied to the fiber substrate 106. Processes for applying the binder composition include spraying, spin-curtain coating, curtain coating, and dipping-roll coating, among other processes. The binder composition can be applied to freshly-formed fibers, or to fibers that have been cooled and processed (e.g., cut, coated, sized, etc.). Embodiments include applying the binder composition to hot glass fibers that are cooled by the evaporation of water from the binder composition. Thermal evaporation may reduce the water content of the binder composition applied to the fibers to 3-7 wt. % as the binder-fiber amalgam is collected on a conveyor belt that moves the amalgam to a curing oven. The water content of the binder-fiber amalgam on the conveyor belt is referred to as the ramp moisture of the binder.

The ramp moisture of the binder-fiber amalgam may be measured 108. It has been discovered that a ramp moisture ranging from 3.5 wt. % to 4.5 wt. % (e.g., 4 wt. %) for binder-fiber amalgams made with the present binder compositions can produce binder-reinforced composites with increased tensile strength and reduced droop compared to the same amalgams outside this ramp moisture range. In order to maintain the ramp moisture in the target range, the water level in the binder-fiber amalgam is sampled on the conveyor and the water content of the upstream binder composition is adjusted as necessary to maintain the target ramp moisture range.

Exemplary processes for measuring the ramp moisture 108 may include a periodic removal of a sample of the binder-fiber amalgam on the conveyor an measuring the difference in weight between moist and fully dehydrated sample. Another process involves spectroscopic measurements of the water content in the binder-fiber amalgam. The spectroscopic techniques may include measurements of microwave and/or near infrared frequencies in the amalgam to determine the ramp moisture.

The binder-fiber amalgam is then transported by the conveyor to a curing oven where the amalgam is cured into the composite 110. As the amalgam travels through the curing oven it is heated to a curing temperature for a set period of time in order to effect the polymerization of the starch and polycarboxylic acid reactants. Exemplary curing temperatures range from 200° C. to 260° C.; 230° C. to 260° C.; 230° C. to 240° C.; etc. The curing amalgam may be heated to the curing temperature for a period of about 0.5 minute to about 100 minutes (e.g., about 1 minute to about 20 minutes; about 1 minute to about 15 minutes, about 2 minutes to 4 minutes, etc.).

The cured composite emerging from the curing oven may be cooled 112. Exemplary cooling may include conveying the cured composite through a cooling chamber or table where air is flowed through the composite. For example, room temperature air (e.g., 23° C.) may be flowed through the composite in a direction that is perpendicular to direction in when the composite is being conveyed through the cooling chamber/cooling table. In some instances, the air is blown upwards through the composite by one or more cooling fans positioned below the composite, while in additional instances the air is blown downwards through the composite by one or more cooling fans positioned above the composite.

In some embodiments, a dedusting agent may join the flow of cooling air being blown through the cooling cured composite. The dedusting agent may be introduced to the composite through spray nozzles (e.g., 2-6 spray nozzles) that aerosolize the dedusting agent before it is carried by the cooling air into the composite. In these embodiments, the flow of cooling air distributes the dedusting agent throughout the composite, and may create a uniform distribution of the dedusting agent in the final fiber-containing composite product. The dedusting agent may be introduced through the spray nozzles at rates ranging from 1 ml/min/nozzle to 100 ml/min/nozzle.

In additional embodiments, a dedusting agent may be applied to the composite after it has been cooled. For example, the dedusting agent may be sprayed into the cooled, cured composite after it passes through a cooling chamber or across a cooling table. In these embodiments, the dedusting agent is more concentrated around the surfaces of the final fiber-containing composite that are exposed to the sprayed dedusting agent than the bulk of the composite.

In some instances, the cured binder-fiber amalgam is the final fiber-containing composite product. In other instances, the cured amalgam is formed into the final fiber-containing composite product 114. When the final product is an insulation batt, final forming steps may include one or more of (i) compressing, cutting, and/or shaping the cured amalgam into the shape of the insulation batt, (ii) applying a facer to the batt, and/or (iii) applying a dedusting agent (e.g., a dedusting oil) to the insulation batt.

Exemplary Systems for Making Fiber-Containing Composite Products

Figure 2:
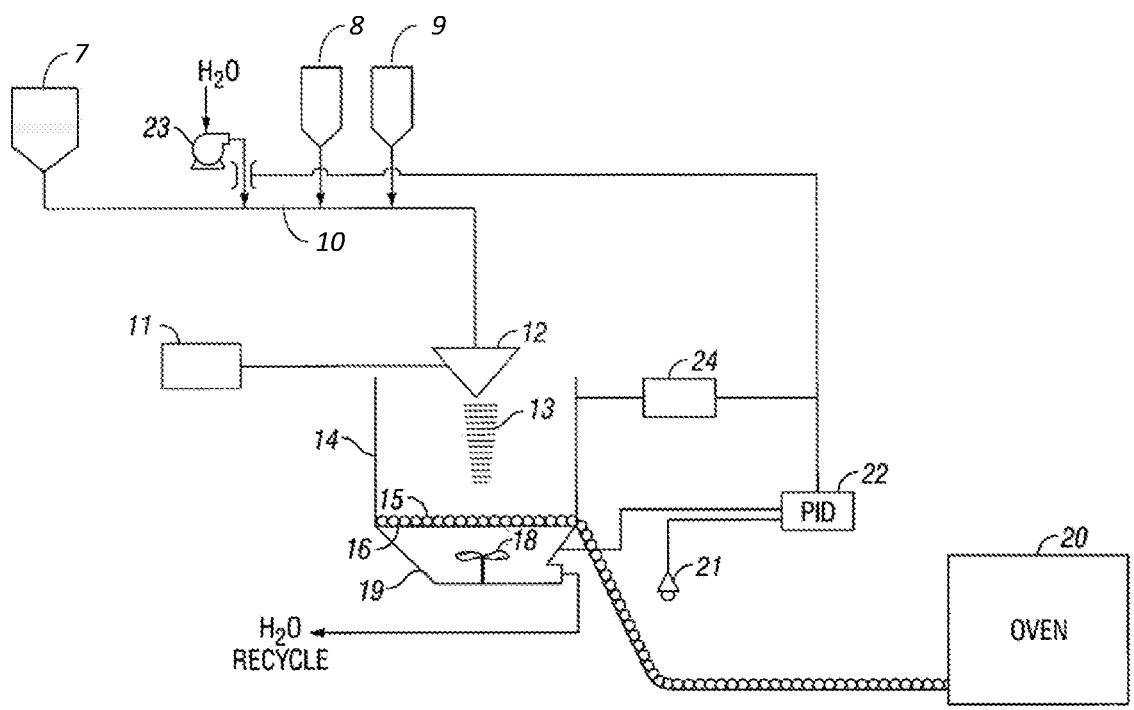
FIG. 2 is a simplified schematic of selected aspects of a system for making fiber-containing composites according to embodiments of the invention.

FIG. 2 shows an exemplary system 200 for making fiber-containing composite products such as fiberglass insulation. The system 200 includes a binder table 10 which is fed by a number of fluid inputs to combine and mix the binder composition that is applied to the fiber substrate. In the embodiment shown, the binder table 10 is fed by a supply of concentrated binder solution 7, and additional binder compounds supplied through sources 8 and 9. The binder table 10 is also fed by a supply of external water and/or aqueous solution whose supply rate is controlled by fluid pump 23. The binder components provided by these fluid inputs are mixed in the binder table 10 to form the binder composition with a target concentration (e.g., 5 wt. % to 15 wt. % based on the total weight of the binder composition) that is applied to the fibers.

In the simplified schematic shown in FIG. 2, the binder table 10 is a manifold of connected conduits that dilutes the binder solution and mix in any additional binder components through turbulent mixing of these components in the conduit manifold. Alternate embodiments can have the supply of binder solution 7, water/aqueous solution supplied through fluid pump 23, and the sources of additional binder 8 and 9 all being supplied to a mixing vessel (not shown) that may include equipment to stir and/or agitate the binder components into a homogeneous binder composition. Alternate embodiments may also include more or fewer independent sources of additional binder compounds than sources 8 and 9 illustrated in FIG. 2.

FIG. 2 also shows a source of fiber material 11 that supplies the material to fiber former 12 that makes the plurality of fibers 13. When the fibers are glass fibers, the source of fiber material 11 may be a furnace that melts the glass used in the fibers. The molten glass may then be sent to the fiber former 12, which in the case of glass fibers can be a spinner disk. The molten glass is extruded through orifices in the spinner disk to form the fibers 13.

As the fibers 13 are falling into a collection box 14, the binder composition is applied to them on the way down. In the case of glass fibers, the just formed fibers are still hot and solvent in the applied binder composition rapidly evaporates to concentrate the binder while also cooling the glass fibers 13. In system 200, the binder composition may be sprayed though an array of nozzles that are radially arranged around the fibers 13 that are falling onto the conveyor 16 in the collection box 14. The uncured binder-coated fibers form an binder-fiber amalgam 15 that may have the form of a pack or mat on the conveyor 16, which may be continuously moving in operation.

In the embodiment illustrated by system 200, a fan 18 may circulate air or some other drying gas through the uncured binder-fiber amalgam 15 to further evaporate solvent (e.g., water) from the binder. In the embodiment shown in system 200, a single fan 18 is illustrated to provide a single zone of drying gas though the uncured binder-fiber amalgam 15. Additional embodiments (not shown) can have more than one fan circulating air over and/or through the uncured binder-fiber amalgam 15 at one or more gas flow velocities.

System 200 also shows a drop out box 19 that collects binder composition that runs off the binder-fiber amalgam and conveyor 16. The belts used on conveyor 16 may be perforated or otherwise permeable to the binder composition to facilitate its migration to the drop out box 19. The collected binder composition may be discarded, or it may be returned to the binder table 10 and combined with fresh binder solution and other binder components into additional binder composition that is applied to the fibers 13.

The conveyor 16 transports the binder-fiber amalgam 15 to a curing oven 20 to cure the binder and form the initially-cured fiber-containing composite. The binder-fiber amalgam may run continuously through the curing oven 20 and exit to additional equipment (not shown) where the initially-cured fiber-containing composite is further processed (e.g., shaped, compressed, cut, etc.) and/or packaged into the final fiber-containing composite product. The curing oven 20 includes one or more heating zones that raise the temperature of the binder-fiber amalgam to a curing temperature. In the case of a binder-fiber amalgam made from glass fibers in the present binder compositions the curing oven 20 raises the temperature of the binder-fiber amalgam to a curing temperature of 200° C. to 260° C.; 230° C. to 260° C.; 230° C. to 240° C.; etc. The curing amalgam may be heated to the curing temperature for a period of about 1 minute to about 100 minutes (e.g., about 1 minute to about 20 minutes; about 1 minute to about 15 minutes, about 2 minutes to 4 minutes, etc.). The curing oven may include temperature sensors (not shown) that monitor the temperature of the curing binder-fiber amalgam on a periodic or continuous basis. Data collected from the temperature sensors may be use to automatically adjust oven temperature to maintain a target temperature in the curing binder-fiber amalgam.

System 200 further includes a sub-system for monitoring and adjusting the ramp moisture of the binder-fiber amalgam 15 on conveyor 16 before it reaches the oven 20. This sub-system includes a spectroscopic moisture sensor 21 that can measure the ramp moisture level of the binder-fiber amalgam 15 at one or more locations on the conveyor 16 before the amalgam reaches the oven 20. The measurement data from sensor 21 is transmitted to an analysis and control unit 22 that compares the data to a target ramp moisture level and issues commands as needed to maintain the ramp moisture as close as possible to the target ramp moisture level. In the embodiment shown, the analysis and control unit 22 is a Proportional Integral Derivative (PID) unit that can send electronic commands to adjust one or more of (i) the rate of water/aqueous solution flow from pump 23 into the binder table 10, (ii) the speed of fan 18 that blows drying gas though the binder-fiber amalgam in collection box 14, and (iii) the temperature of the collection box 14 set by heating unit 24. When the ramp moisture measured by sensor 21 is above the preset range, analysis and control unit 22 can issue commends to reduce the flow of water/aqueous solution supplied to binder table 10, thereby increasing the concentration of the binder composition being applied to the fibers 13. The increase in the concentration of the binder composition results in less water in the binder-fiber amalgam 15, which reduces the ramp moisture. Alternatively (or in addition) the analysis and control unit 22 can issue a command to increase the speed of fan 18 to increase the flow rate of drying gas through the binder-fiber amalgam, thereby increases the rate of reduction in the ramp moisture of the amalgam. Also alternatively (or in addition) the analysis and control unit 22 can issue a command to the heating unit 24 to increase a temperature in the collection box 14, thereby increasing the rate of solvent evaporation from the binder composition coating the fibers 13 and/or in the binder-fiber amalgam 15.

In an alternate embodiment that is not shown by system 200, the spectrographic sensor 21 may be replaced or complemented by manual sampling of the ramp moisture and adjustments to one or more of the pump 23, fan 18, and heating unit 24. For example, samples from the binder-fiber amalgam 15 may be pulled at various times and locations from the conveyor 16 and measured to determine the ramp moisture. Exemplary measurements may include comparing the weight of the amalgam sample before and after it has been heated to drive off water. These measurements may then be used to determine what adjustments (if any) need to be made to one or more of the pump 23, fan 18, and heating unit 24 to keep or bring the ramp moisture of the binder-fiber amalgam 15 in the target range.

As noted above, for an amalgam of glass fibers and binder the target ramp moisture is typically 3.5 wt. % to 4.5 wt. % (e.g., about 4 wt. %) based on the weight of the binder. It has been discovered that glass binder-fiber amalgams with ramp moistures in this range produce binder-reinforced composites with increased tensile strength and reduced droop compared to the same amalgams outside this ramp moisture range. Thus the system 200 includes a sub-system for keeping the ramp moisture in a target range to improve the quality of the final fiber-containing composite products.

Exemplary Fiber-Containing Composite Products

The present fiber-containing composite products may take a variety of forms such as construction materials including piping insulation, duct boards (e.g. air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

The fibers and binder composition, along with the processing conditions, are selected to produce fiber-containing composites with desired physical properties and aging characteristics. For example, when the fiber-containing composite is a thermal insulation batt, the ordinary (i.e. unweathered) parting strength may be at least about 120 g/g (e.g. at least about 150 g/g). An exemplary range for the ordinary parting strength may be about 120 g/g to about 400 g/g. The weathered parting strength may also be at least about 120 g/g (e.g. at least about 150 g/g), where weathered parting strength is measured after fiber-containing composite has been subjected to elevated temperature (e.g. about 120° F. or more) and humidity (e.g. about 95% or more relative humidity) for a period of time (e.g. about 7 days, about 14 days, etc.). An exemplary range for the weathered parting strength may be about 120 g/g to about 400 g/g.

Additional physical properties of the fiber-containing composite may include a density that range from about 5 $kg/m^3$ to about 100 $kg/m^3$. More specific density ranges may include about 5 $kg/m^3$ to about 20 $kg/m^3$; and about 10 $kg/m^3$ to about 80 $kg/m^3$, among other density ranges. Specific exemplary densities of a the fiber-containing composite may include about 5 $kg/m^3$; about 10 $kg/m^3$; about 15 $kg/m^3$; about 20 $kg/m^3$; about 25 $kg/m^3$; about 30 $kg/m^3$; about 35 $kg/m^3$; about 40 $kg/m^3$; about 45 $kg/m^3$; about 50 $kg/m^3$; about 55 $kg/m^3$; about 60 $kg/m^3$; about 65 $kg/m^3$; about 70 $kg/m^3$; about 75 $kg/m^3$; and about 80 $kg/m^3$, among other densities. Densities for the fiber-containing composite may vary depending on the type of composite made. For example, when the fiber-containing composite is a thermal insulation batt, a density range of about 4 $kg/m^3$ to about 12 $kg/m^3$ is common, although not the only density range. When the fiber-containing composite is duct board, a density range of about 30 $kg/m^3$ to about 100 $kg/m^3$ is more typical, although again not the only density range.

The fiber-containing composite may have a thermal conductivity, A, of less than 0.05 W/mK. An exemplary range of the thermal conductivity for the fiber-containing composite may include about 0.020 W/mK to about 0.051 W/mK.

Fiber-containing composites that are thermal insulation batts may have an ordinary (i.e. unweathered) rigidity, as measured by droop level, of about 3 inches or less (e.g. 2.5 inches or less). They may have a weathered droop level of about 5 inches or less (e.g. about 3.5 inches or less). The composites may also have an ordinary recovery level after compression of about 6 inches or more (e.g. 6.5 inches or more). They may have a weathered recovery level of about 5 inches or more (e.g. about 6 inches or more). The droop levels and recovery level ranges may vary depending on the type of fiber-containing composite. For example, a fiber-containing composite that is duct board may have an ordinary recovery level of about 0.9 inches to about 1.1 inches (although this is not the only range of thickness recovery for duct board).

The fiber-containing composites may be made to limit the amount of volatile organic compounds (VOCs) emitted from the composites. Exemplary levels of VOC emissions from the fiber-containing composites may be about 1 lb/hour or less (e.g. about 0.8 lb/hour or less).

As noted above, the fibers in the fiber-containing composite may make up about 50 wt. % to about 99.5 wt. % of the fiber-containing composites, with most of the remaining weight of the composite being the cured binder. Because the cured binder will burn off the composite when it is exposed to intense heat and flame, the loss of weight on ignition of the composite (LOI) may range from about 0.5 wt. % to about 50 wt. %. Additional LOI ranges may be from about 1 wt. % to about 10 wt. %; about 2 wt. % to about 10 wt. %; and about 3 wt. % to about 6 wt. %, among other LOI ranges. LOIs for the fiber-containing composite may vary depending on the type of composite made. For example, when the fiber-containing composite is a thermal insulation batt, an exemplary LOI range may be about 1 wt. % to about 10 wt. % (although this is not the exclusive range). When the fiber-containing composite is duct board, a typically LOI range may been about 15 wt. % to about 22 wt. % (although again this is not the exclusive range).

The fiber-containing composites are water resistant. Exemplary levels of water absorption in the composites may be about 5 wt. % or less (e.g., 2.5 wt. % or less; 1 wt. % or less; 0.5 wt. % or less), based on the weight of the fiber-containing composite. The fiber-containing composites may also generate reduced levels of particles during transport and installation. For example, when the fiber-containing composite is thermal insulation batt, it may generate dust levels of about 10 grams to about 50 grams per 10,000 $ft^2$ of the composite. When the fiber-containing composite is duct board, it may generate dust levels of about 0.03 grams to about 3 grams per pound of the duct board.

Figure 3A:
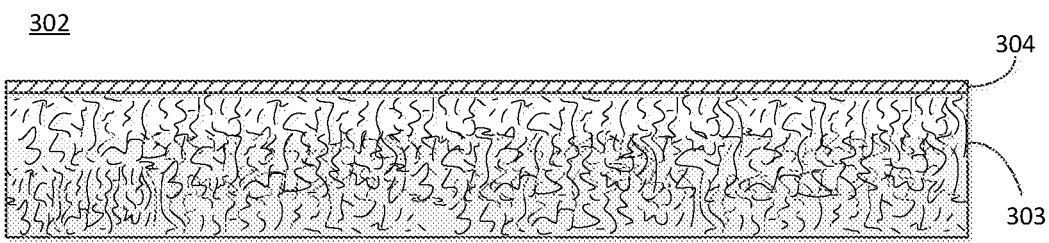
FIG. 3A is simplified illustration of an exemplary fiber-containing product in the form of a batt material according to embodiments of the invention.
Figure 3B:
FIG. 3B is simplified illustration of an exemplary fiber-containing product in the form of an insulation/duct/elevated temperature board according to embodiments of the invention.
Figure 3C:
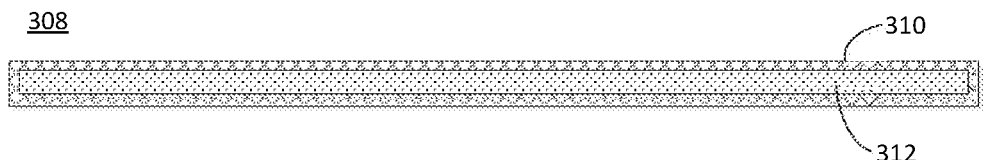
FIG. 3C is simplified illustration of an exemplary fiber-containing product in the form of a flexible insulation material according to embodiments of the invention.

FIG. 3A-C illustrate some of these exemplary composite materials. FIG. 3A is a simplified schematic of an exemplary fiber-containing batt material 302 that may be used for building insulation. The material 302 may include a batt 303 of non-woven fibers held together by the binder. The fibers may be glass fibers used to make fiberglass insulation (e.g., low-density or high-density fiberglass insulation), or a blend of two or more types of fibers, such as a blend of glass fibers and organic polymer fibers, among other types of fibers. In some examples, a facer 304 may be attached to one or more surfaces of the batt 303. Exemplary thicknesses of the batt 303 may range from about 1 cm to about 40 cm (e.g. about 2 cm to about 30 cm).

FIG. 3B is a simplified schematic of an exemplary fiber-containing composite board 306 that may be used as an insulation board, duct board, elevated temperature board, etc. The fibers in board 306 may include glass fibers, organic polymer fibers, carbon fibers, mineral fibers, metal fibers, among other types of fibers, and blends of two or more types of fibers.

FIG. 3C is a simplified schematic of an exemplary fiber-containing flexible insulation material 308 that may be used as a wrap and/or liner for ducts, pipes, tanks, equipment, etc. The fiber-containing flexible insulation material 308 may include a facer 310 attached to one or more surfaces of the fiber material 312. Exemplary materials for the facer 310 may include fire-resistant foil-scrim-kraft facing.

Specific examples of fiber-containing composites that use the present binder compositions include thermal, thermoset insulation batts, such as low-density fiberglass insulation batt (e.g. less than about 0.5 $lbs/ft^3$) and high-density fiberglass insulation batt. Additional examples include piping insulation, duct boards, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation rolls, exterior foundation insulation board, and marine hull insulation.

As noted above in the discussion of the binder composition, the present fiber-containing composite products may be free of melanoidin compounds initiated by the reaction of a carbohydrate reducing sugar with a nitrogen nucleophile. In some instances, the fiber-containing binder may be free of any nitrogen-compounds when no nitrogen-containing compounds are added from the binder composition.

EXAMPLES

In a first set of experiments, evaluations were conducted on the effects of carbohydrate size on the unaged and aged tensile strength of a cured binder. The binders were made from binder compositions that included the carbohydrate (or repeating carbohydrate unit in the case of maltodextrin and the starches) and citric acid in a 1:1 molar ratio. The tensile strengths of the binders were measured with a dogbone strength test method that was conducted according to the description below.

Samples of binder composition weighing 80 g and having a 50 wt. % solids level are mixed with 1000 g of glass beads (borosilicate glass with average diameter of 1.0 mm) to make uncured composites. An one ounce sample of the uncured composite is spread into dogbone molds and pressed in the mold at a pressure of about 5,000 psi (at room temperature of 23° C.). The dogbone sample is then released from the mold and heated at about 400° F. for about 20 minutes to form cured dogbone composites. The cured dogbone composites are roughly 25 mm wide and 6 mm thick.

Figure 4:
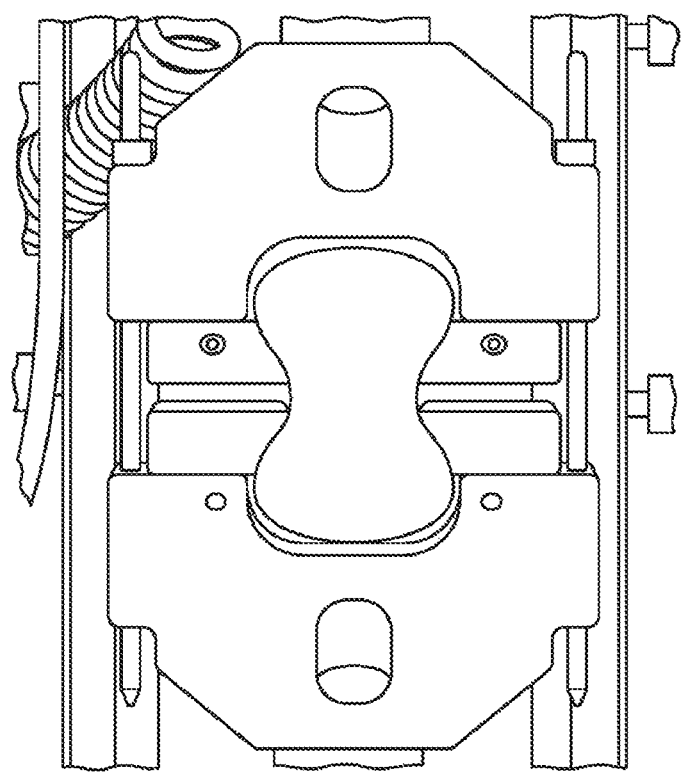
FIG. 4 is a picture of a cured dogbone composite placed in an Instron tensile strength measuring instrument.

The unaged composites are taken out of the curing oven, brought to room temperature (e.g., 23° C.) and placed in an Instron tensile strength testing instrument (Harry W. Dietert Co.—Tensile Core Grip Assembly Part No. 610-7CA) as shown in FIG. 4. The aged composites are taken from the curing oven and placed for 24 hours in a humidifying oven set at approximately 90% humidity and 90° F. for ageing. After the aged samples are cooled (to room temperature, 23° C.) for approximately 8 hours, they are placed in the Instron instrument to test their tensile strength.

The results of the strength tests for six different kinds of carbohydrate combined in a 1:1 molar ratio with citric acid are listed in Table 1 below:

TABLE 1

Tensile Stress of Dogbone Composites Made with Citric Acid and Carbohydrate

| Carbohydrate | Mw (Daltons) | Unaged Tensile Strength (MPa) | Aged Tensile Strength (MPa) |
| --- | --- | --- | --- |
| Sorbitol | 182 | 2.1 | 1.1 |
| Maltodextrin | 8000 | 3.3 | 1.9 |
| Starch-1 (Dextrin) | $1 \times 10^5$ | 3.4 | 1.9 |
| Starch-2 | $5 \times 10^5$-$1 \times 10^6$ | 4.0 | 2.0 |
| Starch-3 | $3 \times 10^6$-$5 \times 10^6$ | 4.5 | 3.6 |
| Starch-4 | $14 \times 10^6$ | 3.5 | 2.2 |

The tensile strength test results show that binder compositions containing citric acid and starch had increased tensile strength compared with smaller carbohydrates under both unaged and aged conditions. However, the relationship between increased tensile strength and increased-size starch does not extend indefinitely. As the size of the starch increased from 3-5 million Daltons to 14 million Daltons the strength of the binder actually decreased by 22% for unaged tensile strength and 39% for aged tensile strength. The decreases indicate that there is a peak in the correlation between starch size and tensile strength where the tensile strength decreases for both larger and smaller-sized starches (or other carbohydrates).

Another set of experiments examined the effect of the ionic charge of the starch in the binder composition on tensile strength. This set of experiments made binders from a non-ionic starch and an ionic starch (i.e. cationic starch), respectively, combined in a 1:1 molar ratio (on a repeating carbohydrate unit basis) with citric acid. Both starches were roughly the same size, with a molecular weight of 3-5 million Daltons. This normalized the role of starch size in the tensile strength results, which was demonstrated in the first set of experiments to have an effect. The results of the dogbone tensile strength tests are shown in Table 2 below.

TABLE 2

Tensile Stress of Dogbone Composites Made with Citric Acid and Ionic/Non-Ionic Starch

| Carbohydrate | Mw (Daltons) | Charge | Unaged Tensile Strength (MPa) | Aged Tensile Strength (MPa) |
| --- | --- | --- | --- | --- |
| Starch-5 | $3 \times 10^6$-$5 \times 10^6$ | Non-Ionic | 3.6 | 3.2 |
| Starch-6 | $3 \times 10^6$-$5 \times 10^6$ | Ionic | 4.5 | 3.6 |

The tensile strength test results show that binder compositions containing citric acid and ionic starch had significant increased unaged tensile strength (about 20% higher) compared to the non-ionic starch. However, the ionic starch showed decreased aged tensile strength retention (about 11% lower) compared to the non-ionic starch. The decrease in tensile strength retention under the aged conditions may be explained, at least in part, by an increase in the hydrophilicity and lower moisture resistance of the binder made with the ionic starch.

In another set of experiments, the effect of the molar ratio of the citric acid to the starch on tensile strength of the binder was measured. Seven binder compositions made from the same starch were tested at molar ratios of citric acid/starch carbohydrate repeating units ranging from 2:1 to 1:3. The unaged and aged tensile strength of dogbone composites were tested for each binder composition and the results are listed in Table 3 below.

TABLE 3

Tensile Stress Dogbone Composites as Function of Citric Acid/Starch Molar Ratio

| Molar Ratio Citric/Starch | Unaged Tensile Strength (MPa) | Aged Tensile Strength (MPa) |
| --- | --- | --- |
| 2:1 | 2.6 | 2.1 |
| 1.5:1 | 3.4 | 2.2 |
| 1:1 | 3.9 | 2.7 |
| 1:1.5 | 4.1 | 2.7 |
| 1:2 | 3.9 | 2.8 |
| 1:2.5 | 4.2 | 2.6 |
| 1:3 | 4.1 | 2.7 |

The tensile strength tests show peak mechanical performance when the molar ratios of the citric acid and starch range from 1:1 to 1:3. Thus, it is advantageous to use molar ratio of citric acid-to-starch in this range. As shown in Table 9 below, a citric acid-to-starch molar ratio of 1:1 to 1:3 also produces a reduced amount of volatile organic compounds.

In another set of experiments, the effect of adding low molecular weight crosslinkers on the tensile strength of the binder was measured. One binder composition included cationic starch, glycerol, and citric acid in a mole ratio of 1:1:2. Another binder composition included a pre-reacted adduct of maleic anhydride and glycerol in a molar ratio of 1:1 that was added to a composition of cationic starch and citric acid which also had a 1:1 mole ratio. The unaged and aged tensile strength of dogbone composites were tested for each binder composition and the results are listed in Table 4 below.

TABLE 4

Tensile Stress Dogbone Composites as Function
of Added Low Molecular Weight Crosslinkers

| (Molar Ratio) | Unaged Tensile Strength (MPa) | Aged Tensile Strength (MPa) |
|---|---|---|
| Citric acid:Starch (1:1) | 4.1 | 1.6 |
| Citric Acid:Starch:Glycerol (2:1:1) | 5.5 | 3.5 |
| Citric acid:Starch:Maleic Anhydride:Glycerol (1:1:1:1) | 5.6 | 3.8 |

The tensile strength test results show that both binder compositions having low molecular weight crosslinkers had significantly higher unaged tensile strength (about 34% higher) compared to the citric acid-and-starch binder composition that lacked the crosslinkers. The aged tensile strength was also significantly improved (about 218% and 234%, respectively for the glycerol and maleic anhydride-glycerol adduct containing binder compositions) compared to the citric acid-and-starch binder composition that lacked the crosslinkers.

Another set of experiments compared droop (i.e., sagging) of R-19 thermal insulation bats as a function of the ramp moisture for an inventive binder composition. Droop test measurements were made by laying a 36 inch long sample of insulation batt on a platform that supports the sample on opposite ends while suspending the middle of the sample in the air. The last six inches of each supported end of the batt make contact with the test platform and the depth of sag in the middle of the batt is measured in inches. Samples with less sag depth are considered more rigid than those with more sag depth. Thus the droop test is a proxy for insulation batt rigidity. In each test run, the inventive binder composition and the dimensions of the batt samples were the same except for the different levels of moisture still present in the binder as the binder-fiber amalgam was being conveyed on the ramp. The inventive binder composition was made from a binder solution that included 22 wt. % starch (CatoSize 270A), 26 wt. % citric acid, 2.4 wt. % sodium hypophosphite, 0.10 wt. % biocide (Kathon), with the remaining balance water. The results of the droop test measurements are summarized in Table 5 below.

TABLE 5

Droop (Sagging) of the R-19 Batts as a Function of Ramp Moisture

| Entry | % Ramp Moisture | Temperature (° F.) | Droop (Inches) |
|---|---|---|---|
| 1 | 1.0 | 460 | 3.5 |
| 2 | 2.2 | 500 | 2.6 |
| 3 | 4.1 | 490 | 2.4 |
| 4 | 4.1 | 460 | 2.2 |

The droop test results show that a ramp moisture around 4 wt. % imparts significantly less droop in the insulation batt than ramp moistures of 2 wt. % or 1 wt. %. Additional tests confirmed that higher ramp moistures did not further decrease the droop, and required increasingly long cure times and an increased amount of binder composition that did not fully cure.

Additional experiments measured the recovery values of R-19 insulation batt made with inventive binder compositions after (i) short recovery times and (ii) one week recovery times. The recovery measurements largely followed the protocols for recovery testing described in the ASTM C167 and CAN/ULC-S702-97 standards. The measurements started by twice dropping a 48 inch long batt sample that had been allowed to lay undisturbed for 5 minutes on a flat surface prior to dropping. The batt sample is dropped on each of its long edges onto a flat surface from a distance of approximately 18 inches. Recovery measurements are made immediately following the drops for the short recovery time measurements and after one week for the one-week recovery time measurements.

In both the short and one-week recovery time measurements, recovery is measured as a thickness (in inches) along various points of the batt sample. The thickness is measured by pushing a pin perpendicular into the sample until a bottom end of the pin contacts the surface upon which the sample is resting the top surface of the batt is determined by resting a disk, about 3 inches in diameter, on the top surface of the batt sample. The pin passes through the center of the disk, and the distance between the bottom end of the pin and the level of the disk is the measured recovery thickness. Several measurements can be made on each sample and averaged to calculate a mean recovery thickness ($\bar{R}$) using the formula:

$$\bar{R} = \frac{\sum R}{n}$$

where $\Sigma R$ is the sum of the individual recovery thickness measurements (R), and n is the total number of measurements. Mean thickness recovery ranges for R19 batts made with the inventive binder composition were typically 7.3-7.8 inches for short recovery times and 6.3-7.4 inches for the 1-week recovery times.

Comparison of Rigidity and Recovery Performance with LOI and Ramp Rate for R19 Fiberglass Batts For many types of binder compositions the rigidity and recovery performance of R19 fiberglass insulation batts improves when more cured binder is added to the batts. However, adding more binder increases production costs, so binder compositions that produce batts with suitable rigidity and recovery at low LOI (i.e., low amounts of binder) are desirable. Comparative measurements of droop (i.e., rigidity) and mean thickness recovery as a function of LOI and ramp rate were taken on samples of R19 fiberglass insulation batts made with the inventive binder composition. Droop and recovery measurements were taken on samples of R19 batts made with less binder (i.e., lower LOIs of 3.5 wt. % to 5 wt. %) and those with more binder (i.e., higher LOIs of 6 wt. % to 8 wt. %), as well as samples made with lower ramp moistures (i.e., 1% to 2.5%) and those made with higher ramp moistures (i.e., 3.5% to 10%). The droop and recovery measurements for the samples are listed in Table 6 below:

TABLE 6

Recovery and Droop Measurements for R19 Batt Samples:

| LOI (wt. %) | Ramp Moisture (%) | Recovery (inches) | Droop (inches) |
|---|---|---|---|
| Higher LOI | Low Ramp Moisture | 6.75 | 5.18 |
| Lower LOI | Low Ramp Moisture | 6.82 | 5.27 |
| Lower LOI | High Ramp Moisture | 6.85 | 4.23 |

The surprising result shown in the table is that Recovery and Droop values were relatively unaffected by LOI. This means that adding more binder to the fiberglass batts did not significantly improve either the recovery or droop of the batts. This was contrary to the expectations discussed above where more binder (i.e. increased LOI) normally improves the recovery and rigidity of the batt. It also demonstrates that satisfactory recovery and rigidity values can be achieved at lower LOI levels (e.g., 3.5 wt. % to 5 wt. %) when the batts are made with the inventive binder compositions.

Another surprising result is that while changes in LOI did not significantly affect recovery and rigidity values, increasing the ramp moisture did provide a significant improvement to rigidity even at Lower LOIs. Since increasing ramp moisture does not add nearly as much cost to the final product as increasing LOI, batts made with lower LOI and higher ramp moisture provide a way to produce a high-quality R19 insulation batt at lower cost.

Corrosion Testing Experiments

Corrosion tests were performed on the present binder compositions with varying amount of a stannous sulfate anticorrosion agent. Test were also performed using a control solution of deionized water and a conventional polyacrylic binder. The corrosion tests involved submerging an iron-containing coupon in a 1% aqueous solution of the binder composition. The coupon is made of cold-rolled mild steel with dimensions of 10 cm×5 cm and a thickness of 2 mm. It's kept in the binder solution for 24 hours at room temperature (about 23° C.) while the solution is stirred continuously at 100 rpm.

The extent of corrosion in the coupon is assessed by measuring the concentration (in parts per million or "ppm") of iron leached into the solution. The iron content is measured using ion chromatography. The corrosion test results are listed in Table 7 below:

TABLE 7

Leached Iron Concentrations In Solutions of Binder Composition

| Solution | Iron Concentration (ppm) |
| --- | --- |
| Deionized Water | 2.2 |
| Polyacrylic Acid Binder Compostion[1] | 650 |
| Inventive Binder Composition[2] (No Anticorrosion Agent) | 250 |
| Inventive Binder Composition (0.25 wt. % $SnSO_4$ Anticorrosion Agent) | 15 |
| Inventive Binder Composition (0.5 wt. % $SnSO_4$ Anticorrosion Agent) | 6.7 |
| Inventive Binder Composition (1.0 wt. % $SnSO_4$ Anticorrosion Agent) | 4.4 |

[1]The Polyacrylic Binder Composition included a 50 wt. % solution of polyacrylic acid (Avg. Mw 2000 Daltons) and triethanol amine. The composition had a —COOH to —OH molar ratio of 2:1 and a pH of 3.2.
[2]The Inventive Binder Composition without the anticorrosion agent included 22 wt. % starch (CatoSize 270A), 26 wt. % citric acid, 2.4 wt. % sodium hypophosphite, 0.10 wt. % biocide (Kathon), with the remaining balance water (~49.5 wt. %).

The corrosion test results show that the water itself was not inherently corrosive, and that the compounds in the binder compositions were responsible for the increased corrosion levels. The most corrosive solution was the conventional polyacrylic acid binder, which was 2.6 times more corrosive than the inventive binder composition without any anticorrosion agent present. The stannous sulfate anticorrosion agent reduced the corrosiveness of the binder composition by 94% at a concentration of 0.25 wt. % (based on the weight of the binder composition). Thus, the stannous sulfate anticorrosion agent is very effective at reducing binder-induced corrosion in the present fiber-containing composite products even at low concentration levels in the binder composition.

Attempts to show the effect of the stannous sulfate anticorrosion agent in the polyacrylic acid binder composition were inconclusive due to the coagulation and precipitation of the multivalent tin ions in the stannous sulfate with the polyacrylic acid molecules. The precipitated coagulation complexes are insoluble in water and rendered the stannous sulfate ineffective as an anticorrosion agent for the polyacrylic acid binder compositions.

Calcium hydroxide (i.e., $Ca(OH)_2$) has shown potential as an anticorrosion agent for the present binder compositions. The above-described corrosion test measured an iron concentration level of 1.7 ppm when 1.6 mole equivalents of $Ca(OH)_2$ per mole of citric acid was added to the inventive binder composition.

Crosslinking Agent Experiments

Figure 5:
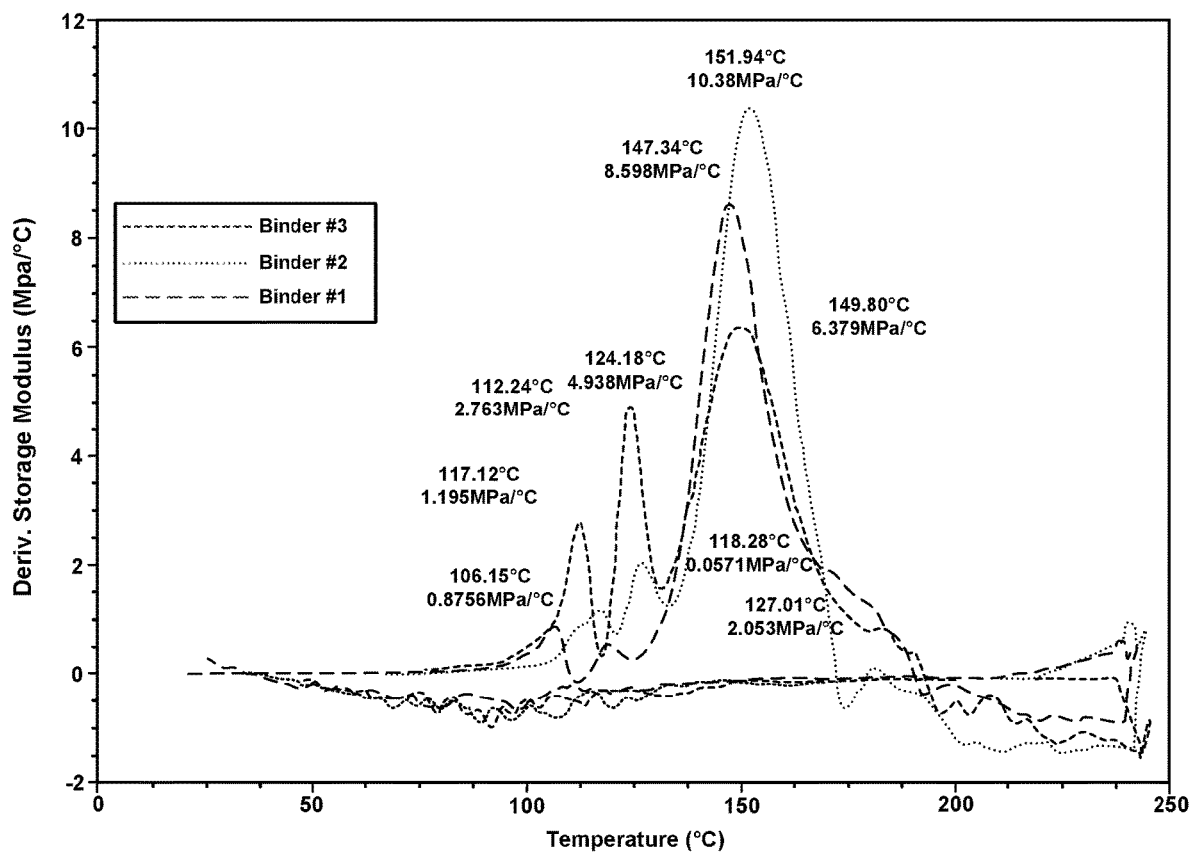
FIG. 5 is a plot of the derivative storage modulus as a function of temperature for curing binder compositions having varying level of a glyoxal crosslinking agent.

Measurements were made of the present binder compositions having varying levels of glyoxal as an added crosslinking agent. Three binder compositions were made with different molar ratios of glyoxal to citric acid. The first binder composition had no glyoxal, the second had glyoxal in a 0.25:1 mole ratio of glyoxal:citric acid, and the third binder composition had glyoxal in a 0.5:1 mole ratio of glyoxal:citric acid. FIG. 5 shows a plot of the derivative of the storage modulus (in units of MPa/° C.) as a function of temperature (in units of ° C.) as the three different binder compositions are cured. The plot for all three binder compositions show large peaks in the temperature range of 147-152° C. that indicate the reaction between the citric acid and starch reactants. The plot for the third binder composition that includes glyoxal in a 0.5:1 mole ratio with the citric acid shows two additional prominent peaks at 112° C. and 124° C. which indicate the gelling of the glyoxal with the starch and the crosslinking reaction of the glyoxal and starch, respectively. These peaks can also be seen in the second binder composition that include glyoxal in a 0.25:1 mole ratio with the citric acid, however they are significantly less intense and shifted to higher temperatures (117° C. and 127° C.) compared to the third binder composition.

The plots show that the third binder composition with the mole ratio of 0.5:1 for the glyoxal to citric acid provided the most crosslinking independent of the citric acid and starch reactions. Those independent starch and glyoxal reactions were significant enough to lower the overall cure temperature of the binder composition compared to the ~150° C. cure temperature for the first binder composition that did not include any glyoxal crosslinking agent.

Figure 6:
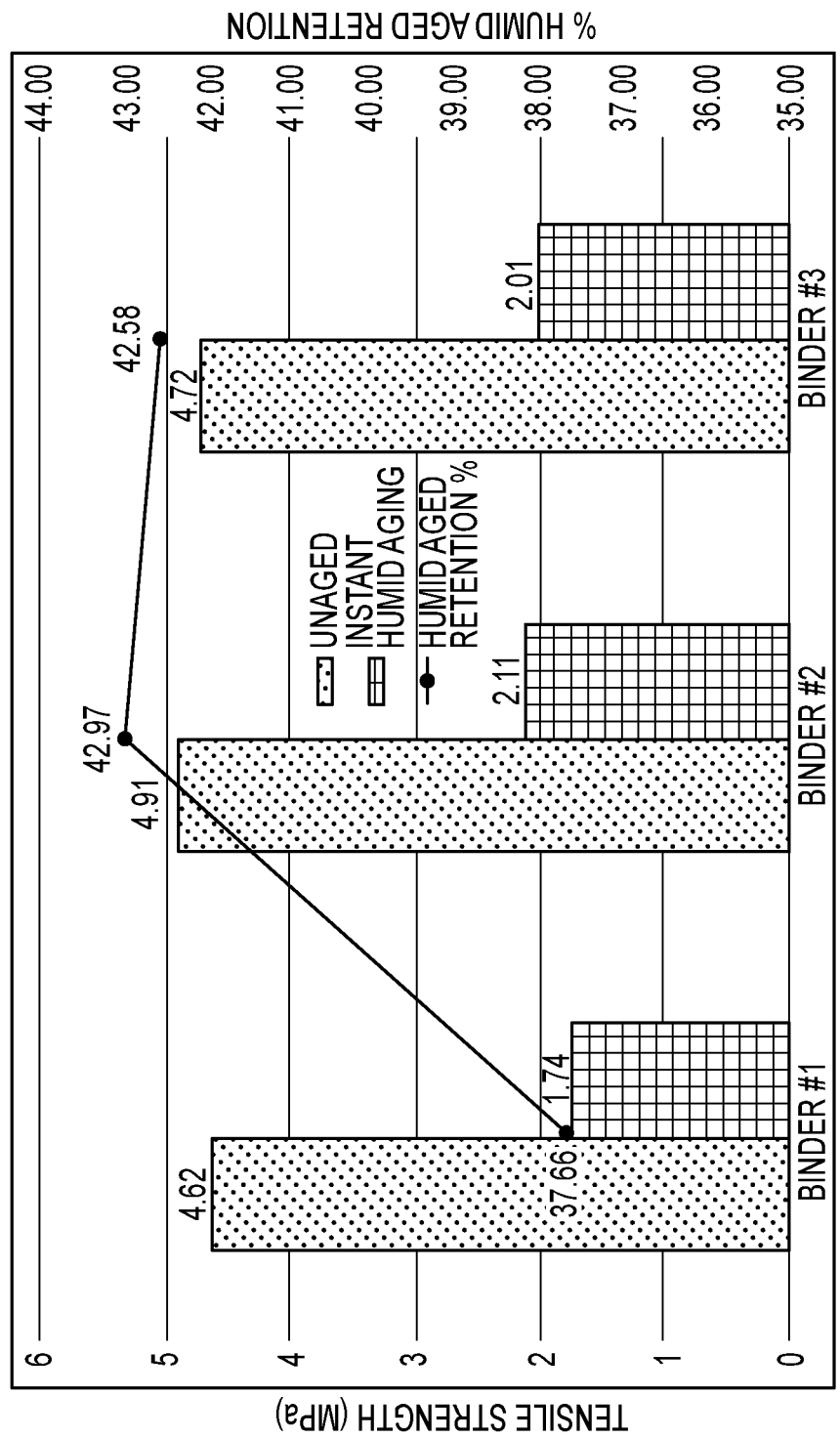
FIG. 6 is a graph of dogbone tensile strength for unaged and humid-aged samples made with binder compositions having varying levels of a glyoxal crosslinking agent.

FIG. 6 shows a graph of dogbone tensile strength tests for the three binder compositions. A first set of "unaged" samples were measured immediately following their formation and cooling to room temperature (~23° C.). A second set of "humid aged" samples were measured after being kept in a humidity chamber at 90° F. and 95% humidity for 24 hours. The left vertical axis of the graph provides a scale for the measured tensile strength (in MPa) and the right vertical axis provides a scale for percentage retention of tensile strength of the dogbone composites in the humid aged condition.

For the second and third binder compositions that included glyoxal as a crosslinking agent at mole ratios of 0.25:1 and 0.5:1 respectively, the percentage of tensile strength retained in the instant humid aged samples was significantly higher than for the first binder composition that did not include any glyoxal. This shows that the presence of glyoxal in the binder compositions provides cured fiber-containing composites with increased tensile strength retention under humid aged conditions. Thus, the addition of a crosslinking agent can be particularly helpful for those composites exposed to hotter, more humid climates.

Exemplary Samples of R19 Insulation Batt and Duct Board Made by the Present Methods of Making Fiber Containing Composites Measurements were made of a number of characteristics of R19 insulation batt and duct board samples made using the present binder compositions and production methods. The measurements are summarized in Table 8 below.

TABLE 8

Measurements of Characteristics of Sample R19 Insulation Batt and Duct Board

| Characteristic Measured | R19 Insulation Batt | Duct Board |
| --- | --- | --- |
| Density (pounds per cubic foot) | 0.5 pcf | 3.25-4.75 pcf |
| Loss on Ignition (LOI) (wt. %) | 3-6 wt. % | 12-25 wt. % |
| Thickness Recovery (inches) | 6-6.5 inches | 0.9-1.2 inches |
| Tensile Strength (psi) EN 1608 Test Method | 0.7 psi | |
| Dust Testing | 20-40 grams per 10,000 ft$^2$ | up to 0.5 g/lb |
| Water Absorption (wt. %) ASTM C1104 Test Method | 0.5 wt. % or less | 8 wt. % or less |
| Flexural Rigidity (E I) | | at least 325 EI |
| Stiffness Rigidity | 5 inches or less droop at 36 inch span | |
| Hot Surface Performance ASTM C411 Requirement | | Satisfied |
| Corrosivity on Steel ASTM C1617 Test Method | Mass loss corrosion rate less than 5 ppm chloride reference solution | Mass loss corrosion rate less than 5 ppm chloride reference solution |
| Smoke Development on Ignition ASTM E84 and E136 Requirments | Flame spread 25 or less, smoke developed 50 or less Non-combustible | Flame spread 25 or less, smoke developed 50 or less |

Loss on Ignition (LOI) measurements of the R19 insulation batt were conducted by weighing samples having a minimum of 100 grams of the batt with any facing, wet spots, or clumping removed to determine a Starting Sample Weight. The samples were placed vertically within an oven (with adequate spacing for good airflow), and the oven temperature was raised to 950° F. (±50° F.) until all the binder was burned away. The samples where then removed from the oven, cooled to room temperature (e.g., ~68° F.) and re-weighed to determine a Final Sample Weight. Percentage LOI was calculated as [(Starting Sample Weight–Final Sample Weight)/Starting Sample Weight]×100.

Volatile Organic Compound Emissions Experiments

Volatile organic compound (VOC) emissions measurements were made of fiber-containing composites having binders made from binder compositions with varying ratios of citric acid to starch. Specifically, fiber-containing composites made having binders made from binder compositions with molar ratios of citric acid to starch at 1:3, 1:2, 1:1, and 2:1 were heated at three different temperatures while VOC measurements were taken. Samples of the fiber-containing composites were placed in a tube furnace had heated to one of three temperatures (210° C., 230° C., or 250° C.). A FID detector was used to measure the amount of VOCs emitted from the sample in micrograms of VOC emissions per gram of the composite. The results are listed in Table 9 below:

TABLE 9

VOC Emissions From Fiber-Containing Composites

| Sample | VOCs emitted at 210° C. (μg/g) | VOCs emitted at 230° C. (μg/g) | VOC emitted at 250° C. (μg/g) |
| --- | --- | --- | --- |
| Binder with 1:3 Molar Ratio of Citric Acid to Starch | 257 | 452 | 1826 |
| Binder with 1:2 Molar Ratio of Citric Acid to Starch | 471 | 584 | 1913 |
| Binder with 1:1 Molar Ratio of Citric Acid to Starch | 2370 | 3088 | 4558 |
| Binder with 2:1 Molar Ratio of Citric Acid to Starch | 16291 | 23117 | 34665 |

The VOC measurements show a significant increase in the VOCs emitted with an increasing molar ratio of citric acid to starch in the binder compositions. Because VOCs are undesirable, the present fiber-containing composites used in high temperature environments may have a citric acid-to-starch molar ratio of 1:1 or less (e.g., a molar ratio ranging from 1:1 to 1:3).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the composition" includes reference to one or more compositions and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A fiber-containing composite comprising:
   woven or non-woven fibers; and
   a binder that holds the fibers together, wherein the binder comprises a reaction product of:
   a starch having a weight average molecular weight that ranges from $1 \times 10^6$ Daltons to $1 \times 10^7$ Daltons, and
   a polycarboxylic acid,
   wherein a molar ratio of the polycarboxylic acid to the starch ranges from 1:2 to 1:3.

2. The fiber-containing composite of claim 1, wherein the woven or non-woven fibers include one or more types of fibers selected from the group consisting of glass fibers, carbon fibers, mineral fibers, stone wool fibers, and organic polymer fibers.

3. The fiber-containing composite of claim 2, wherein the woven or non-woven fibers comprise a batt of the glass fibers.

4. The fiber-containing composite of claim 1, wherein the starch is a cationic starch.

5. The fiber-containing composite of claim 1, wherein the starch has a weight average molecular weight ranging from $3 \times 10^6$ Daltons to $5 \times 10^6$ Daltons.

6. The fiber-containing composite of claim 1, wherein the polycarboxylic acid is not a polymeric polycarboxylic acid.

7. The fiber-containing composite of claim 1, wherein the polycarboxylic acid includes at least one polycarboxylic acid selected from the group consisting of citric acid, oxalic acid, maleic acid, succinic acid, adipic acid, itaconic acid, malic acid, butane tetracarboxylic acid, phthalic acid, isophtalic acid, terephtalic acid, trimellitic acid, pyromellitic acid, and benzophenone tetracarboxylic acid.

8. The fiber-containing composite of claim 1, wherein the polycarboxylic acid comprises citric acid.

9. The fiber-containing composite of claim 1, wherein the binder further comprises an anticorrosion agent.

10. The fiber-containing composite of claim 9, wherein the anticorrosion agent comprises sodium nitrite.

11. The fiber-containing composite of claim 9, wherein the anticorrosion agent comprises stannous sulfate.

12. The fiber-containing composite of claim 1, wherein the fiber-containing composite further comprises a dedusting agent.

13. The fiber-containing composite of claim 12, wherein the dedusting agent comprises a polyether compound.

14. The fiber-containing composite of claim 13, wherein the polyether compound is polyethylene glycol.

15. The fiber-containing composite of claim 13, wherein the fiber-containing composite has an ordinary rigidity of 3 inches or less and a weathered rigidity of 5 inches or less, as measured by droop level.

16. The fiber-containing composite of claim 15, wherein the ordinary rigidity of the fiber-containing composite is 2.5 inches or less.

17. The fiber-containing composite of claim 15, wherein the weathered rigidity of the fiber-containing composite is 3.5 inches or less.

18. The fiber-containing composite of claim 1, wherein the fiber-containing composite is an insulation batt.

19. A fiber-containing composite comprising:
   woven or non-woven fibers; and
   a binder that holds the fibers together, wherein the binder is formed by curing a binder composition comprising:
   20 wt. % to 80 wt. % starch having a weight average molecular weight that ranges from $1 \times 10^6$ Daltons to $1 \times 10^7$ Daltons,
   20 wt. % to 80 wt. % polycarboxylic acid,
   1 wt. % to 10 wt. % cure catalyst, and
   water,
   wherein the water content of the binder composition is determined by:
   measuring a moisture content of the fibers coated with the binder composition;
   comparing the moisture content of the coated fibers to a preset moisture value for the fibers coated with the binder composition; and
   adjusting the water content of the binder composition when the moisture content of the coated fibers differs by more than an accepted deviation from the preset moisture value.

20. The fiber-containing composite of claim 19, wherein a molar ratio of the polycarboxylic acid to the starch ranges from 1:2 to 1:3.

21. The fiber-containing composite of claim 19, wherein the preset moisture value ranges from 4 wt. % to 6 wt. % of the binder composition coated on the fibers.

22. The fiber-containing composite of claim 19, wherein the preset moisture value ranges from 4 wt. % to 5 wt. % of the binder composition coated on the fibers.

23. The fiber-containing composite of claim 19, wherein the accepted deviation from the preset moisture value ranges from 0.5 wt. % to 2 wt. %.

24. The fiber-containing composite of claim 19, wherein the fibers comprise glass fibers.

25. The fiber-containing composite of claim 19, wherein the fibers are 85 wt. % to 99 wt. % of the fiber-containing composite.

26. The fiber-containing composite of claim 19, wherein the starch comprises a cationic starch having a weight average molecular weight ranging from $3 \times 10^6$ Daltons to $5 \times 10^6$ Daltons.

27. The fiber-containing composite of claim 19, wherein the polycarboxylic acid includes at least one polycarboxylic acid selected from the group consisting of citric acid, oxalic acid, maleic acid, succinic acid, adipic acid, itaconic acid, malic acid, butane tetracarboxylic acid, phthalic acid, isophtalic acid, terephtalic acid, trimellitic acid, pyromellitic acid, and benzophenone tetracarboxylic acid.

28. The fiber-containing composite of claim 19, wherein the cure catalyst comprises sodium hypophosphite.

29. The fiber-containing composite of claim 19, wherein the binder composition further comprises:
   1 wt. % to 10 wt. % of an anticorrosion agent.

30. The fiber-containing composite of claim 19, wherein the binder composition further comprises a dedusting oil.

31. The fiber-containing composite of claim 19, wherein the fiber-containing composite further comprises a dedusting agent.

32. The fiber-containing composite of claim 19, wherein the dedusting agent comprises a polyether compound.

33. The fiber-containing composite of claim 32, wherein the polyether compound is polyethylene glycol.

34. A method of making a fiber-containing composite, the method comprising:
applying a binder composition to fibers to form coated fibers, wherein the binder composition comprises:
a starch having a weight average molecular weight that ranges from $1 \times 10^6$ Daltons to $1 \times 10^7$ Daltons, and
a polycarboxylic acid,
measuring a moisture content of the coated fibers, wherein if the moisture content of the coated fibers differs by more than an accepted deviation from a preset moisture value, then the moisture content is adjusted to be closer to the preset moisture value; and
curing the coated fibers in a curing oven to form the fiber-containing composite.

35. The method according to claim 34, wherein a molar ratio of the polycarboxylic acid to the starch ranges from 1:2 to 1:3.

36. The method according to claim 34, wherein the preset moisture value ranges from 4 wt. % to 6 wt. % of the binder composition.

37. The method according to claim 34, wherein the preset moisture value ranges from 4 wt. % to 5 wt. % of the binder composition.

38. The method according to claim 34, wherein the accepted deviation from the preset moisture value ranges from 0.5 wt. % to 2 wt. %.

39. The method according to claim 34, wherein the adjusting of the moisture content to be closer to the preset moisture value comprises adding more water to the binder composition.

40. The method according to claim 34, wherein the adjusting of the moisture content to be closer to the preset moisture value comprises changing a temperature of the coated fibers.

41. The method according to claim 34, wherein the adjusting of the moisture content to be closer to the preset moisture value comprises changing a flow rate of air passing though the coated fibers.

42. The method according to claim 34, wherein the fibers include one or more types of fibers selected from the group consisting of glass fibers, carbon fibers, mineral fibers, stone wool fibers, and organic polymer fibers.

43. The method according to claim 34, wherein the starch comprises a cationic starch having a weight average molecular weight ranging from $3 \times 10^6$ Daltons to $5 \times 10^6$ Daltons.

44. The method according to claim 34, wherein the polycarboxylic acid includes at least one polycarboxylic acid selected from the group consisting of citric acid, oxalic acid, maleic acid, succinic acid, adipic acid, itaconic acid, malic acid, butane tetracarboxylic acid, phthalic acid, isophtalic acid, terephtalic acid, trimellitic acid, pyromellitic acid, and benzophenone tetracarboxylic acid.

45. The method according to claim 34, wherein the binder composition further comprises 1 wt. % to 10 wt. % of an anticorrosion agent.

46. The method according to claim 45, wherein the anticorrosion agent comprises at least one of sodium nitrite and stannous sulfate.

47. The method according to claim 34, wherein the binder composition further comprises a dedusting oil.

48. The method according to claim 34, wherein the fiber-containing composite further comprises a dedusting agent.

49. The method according to claim 34, wherein the dedusting agent comprises a polyether compound.

50. The method according to claim 49, wherein the polyether compound is polyethylene glycol.

51. The method according to claim 34, wherein the fiber-containing composite has an unaged tensile strength of greater than 4.0 and an aged tensile strength greater than 3.0.

* * * * *